United States Patent [19]

Kamijo et al.

[11] Patent Number: 4,556,416
[45] Date of Patent: Dec. 3, 1985

[54] PROCESS AND APPARATUS FOR MANUFACTURING FINE POWDER

[75] Inventors: Eiji Kamijo; Matsuo Higuchi, both of Itami, Japan

[73] Assignee: Sumitomo Electric Industries, Ltd., Osaka, Japan

[21] Appl. No.: 605,489

[22] Filed: Apr. 30, 1984

[30] Foreign Application Priority Data

May 7, 1983 [JP] Japan .................................. 58-79728

[51] Int. Cl.⁴ .............................................. B22F 9/00
[52] U.S. Cl. ................................................. 75/0.5 B
[58] Field of Search ........... 75/0.5 B, 0.5 BA, 0.5 BB, 75/0.5 BC; 423/344–346, 409, 411, 291, 364, 439, 440, 446

[56] References Cited

U.S. PATENT DOCUMENTS

| | | | |
|---|---|---|---|
| 3,535,103 | 10/1970 | Whitfield | 75/0.5 BA |
| 3,545,922 | 12/1970 | Nevenschwander et al. | 423/411 |
| 3,592,627 | 7/1971 | Nevenschwander | 75/0.5 BB |
| 3,671,220 | 6/1972 | Jonsson | 75/0.5 BB |
| 4,289,952 | 9/1981 | Haggert | 423/344 |

Primary Examiner—Wayland Stallard
Attorney, Agent, or Firm—Ernest A. Beutler

[57] ABSTRACT

A process and an apparatus for manufacturing a fine powder of metals or ceramics are proposed in which a mixed gas of volatile metal compound and/or evaporated metal and a reaction gas is reacted in a discharged state while heating by laser beam.

5 Claims, 1 Drawing Figure

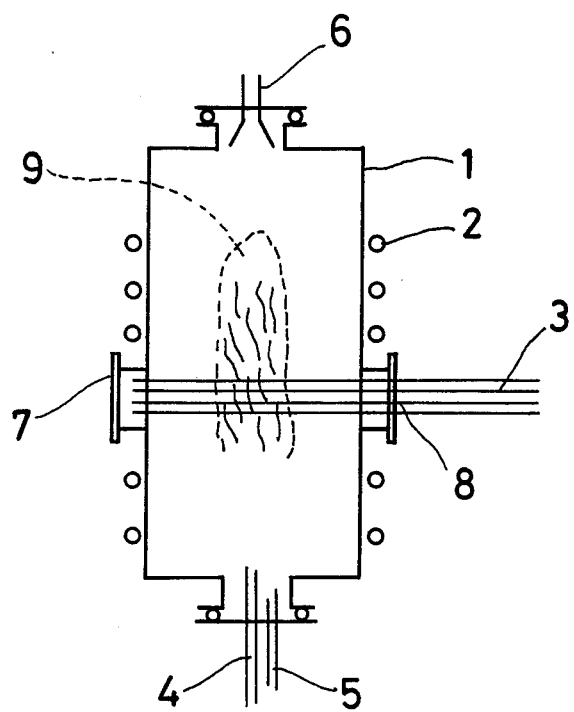

PROCESS AND APPARATUS FOR MANUFACTURING FINE POWDER

The present invention relates to a process and an apparatus for efficiently manufacturing an easy-to-sinter fine powder of metals, nitride such as silicon nitrides, boron nitrides and aluminum nitrides, or carbides such as silicon carbides.

In recent years, various methods for producing fine powder of metals and ceramic materials, particularly nitrides, carbides and diamond, have been proposed. Efforts have been made to develop materials which are stable even at high temperatures, particularly for silicon nitride, boron nitride and silicon carbide. Generally, ceramic materials are produced by molding a powder of material and sintering the molded powder. However, these substances are difficult to sinter. Therefore, super-fine powders of these materials having high sinterability are in strong demand. But, satisfactory synthetic powder has not so far been obtained. Recently, the vapor phase synthesis has been proposed. But, it has several disadvantages: firstly, the synthetic powder produced does not contain only the desired compound but also contain other compounds or elements, or compounds not yet reacted. Secondly the powder is obtained only in a small amount. Another new approach is to use laser beam to heat the material. With this method super-fine powder of high purity can be obtained relatively easily. However, the above-mentioned problems have not been fully solved.

An object of the present invention is to provide a process and an apparatus for manufacturing a fine powder which obviates the above-mentioned shortcomings.

The inventors have made extensive research to solve these problems and reached the present invention. In accordance with the present invention, a reaction gas containing a gas of volatile metal compound and/or evaporated metal as starting materials are introduced into a reaction chamber which is kept in a discharged (or ionized) state. The ionized gas is further excited and heated by laser beams to efficiently produce a fine powder of metal or ceramics.

In accordance with the present invention, a volatile metal compound or compounds and/or an evaporated metal or metals and a reaction gas or gases are used as the material.

The following may be used as a volatile metal compound: silicon tetrachloride ($SiCl_4$), titanium tetrachloride ($TiCl_4$), zirconium tetrachloride ($ZrCl_4$), boron trichloride ($BCl_3$), silicon tetrabromide ($SiBr_4$), silicon tetrahydride ($SiH_4$), titanium hydride ($TiH_2$), zirconium hydride ($ZrH_2$), $SiHCl_3$, $SiH_2Cl_2$, $SiH_3Cl$, $CH_3SiCl$, etc.

The evaporated metals usable include silicon, aluminum, titanium, zirconium, molybdenum and hafnium.

The reaction gases usable include nitrogen, hydrogen, ammonia, carbon dioxide, carbon monoxide, and hydrocarbons expressed by $C_xH_y$.

If the gas of volatile metal compound has a low vapor pressure, hydrogen, nitrogen, argon, helium, etc, may be used as a carrier gas. Reaction can be controlled by adjusting the amount of carrier gas supplied. Nitrogen and hydrogen serve as a reaction gas and also as a carrier gas.

The process according to the present invention is applicable to produce a fine powder of most of nitrides, carbides, carbonitrides, borides and metals. It is suited particularly for powder synthesis of silicon nitride, boron nitride, aluminum nitride, silicon carbide and boron carbide. It is also possible to produce a fine powder of diamond by precisely controlling the synthesis conditions.

Other features and advantages of the present invention will become apparent from the following description taken with reference to the accompanying drawing, which is a schematic view showing an embodiment of apparatus for carrying out the process of the present invention.

Referring to the drawing, an apparatus in accordance with the present invention includes a reaction chamber 1, and an ionization coil 2 for high frequency discharge wound on the outer (sometimes inner) periphery of the reaction chamber. Laser beams 3 of e.g. $CO_2$ gas are adapted to be irradiated through a window 8 into the reaction chamber 1. The laser beams 3 which reached a window 7 are absorbed by a water-cooled copper plate.

Supply ports 4, 5 are provided to introduce into the reaction chamber carrier gas, reaction gas and any other gases necessary for the reaction. The reaction product is collected from the reaction chamber 1 through an exhaust port 6 which is connected to an exhaust pump of high power through a filter for collecting the powder produced.

The process in accordance with the present invention comprises the following steps. Firstly, the entire reaction system including the reaction chamber 1 is exhausted by means of an exhaust pump (not shown) to about $10^{-4}$ torr. A mixture of gases with a controlled mixing ratio is supplied through the supply ports 4, 5 after its pressure has been controlled to several tens to several hundreds torr. The mixed gas is ionized in the reaction chamber 1 by means of the high-frequency induction coil 2. Simultaneously it is excited and heated by the laser beams 3 irradiated through the window 8. As a result, the mixed gas undergoes reaction with a flame 9. The reaction product and the exhaust gas are discharged through the exhaust port 6, and the superfine grain powder produced is collected by a filter (not shown).

Although in the preferred embodiment only the high-frequency discharge has been described, other types of discharge such as direct current discharge and microwave discharge may be used.

Although in the preferred embodiment the induction coil 2 is provided on the outer periphery of the reaction chamber, it may be provided inside it, if necessary.

The supply of gas, heating by laser beam, and ionization may be carried out in any desired order.

The advantages of the present invention are as follows:

(1) In comparison with the case where the excitation and heating process by laser beams or the high frequency ionization process is used singly, the ionization efficiency and thus the reaction efficiency are drastically improved.

(2) Since the reaction gas is ionized, mixed gases which are generally difficult to react can be reacted even at low temperatures.

(3) Since the heating by laser beams and the ionization by high frequency discharge can be controlled independently, an optimum ionization is possible in each reaction. This improves energy efficiency.

EXAMPLE 1

By way of example, the synthesis of fine powder of silicon nitride will be described below. The installation as shown in the drawing was used. $N_2$ gas containing 5 vol % of $SiH_4$ and $NH_3$ gas were supplied into the reaction chamber 1 at a flow rate of 5 l/min and 3 l/min, respectively. The reaction chamber is provided with a high-frequency induction coil for electrodeless discharge. It was examined how the presence or absence of discharged state affects the powder obtained. Heating was performed by use of laser beams at the same time when the reaction gas was introduced. The table 1 shows the particle size and composition of the powder obtained in discharged state and in not-discharged state (comparison).

together with the results. The evaporated metal was produced by a metal evaporizer provided under the apparatus shown in the drawing.

Among these reactions, in any in which the mixed gas was heated by laser beam in a discharged state, it was confirmed that only the aimed compound was obtained with a medium particle size of less than 400 Å with a high reaction efficiency. Hydrogen gas containing 5 vol % of a volatile metal compound was supplied into the reaction chamber at a rate of 5 l/min. The reaction gas was supplied at a rate of 3 l/min. The evaporated metal was supplied at a rate of 0.5 gram per minute. The compound obtained was identified by X-ray diffraction. The medium particle size was determined by examining under a transmission type electron microscope.

TABLE 2

| Volatile metal compound | Evaporated metal | Reaction gas | Discharged or not | Heated by laser | Compound obtained | | Medium particle size | Reaction efficiency |
|---|---|---|---|---|---|---|---|---|
| Present Invention | | | | | | | | |
| $SiH_4$ | — | $C_2H_5$ | O | O | SiC | 100% | 360 Å | 75% |
| — | Si | $NH_3$ | O | O | $Si_3N_4$ | 100% | 320 Å | 85% |
| $CH_3SiCl_4$ | — | — | O | O | SiC | 100% | 380 Å | 90% |
| $SiCl_4$ | Ti | $NH_3$ | O | O | $Si_3N_4$ TiN | 80% 20% | 350 Å | 86% |
| — | Ta | $CH_3, N_2$ | O | O | TaC TaN | 50% 50% | 360 Å | 90% |
| $TiCl_4$ | — | $N_2, H_2$ | O | O | TiN | 100% | 310 Å | 95% |
| Comparison Example | | | | | | | | |
| $SiH_4$ | — | $C_2H_5$ | X | 0 | Si SiC C | 10% 80% 10% | 450 Å | 55% |
| $SiCl_4$ | Ti | $NH_3$ | X | O | Si Ti $Si_3N_4$ TiN | 10% 10% 70% 10% | 480 Å | 60% |
| $TiCl_4$ | — | $N_2, H_2$ | X | O | Ti TiN | 20% 80% | 520 Å | 65% |
| $TiCl_4$ | — | $N_2, H_2$ | X | X | No compound obtained | | | |

TABLE 1

| | present invention | comparison example |
|---|---|---|
| Particle size | 300–400 Å | 500–600 Å |
| Composition | $Si_3N_4$: 100% | Si: 5% |
| | | $Si_3N_4$: 92% |
| | | $Si(NH)_2$: 3% |
| Reaction efficiency | 80% | 50% |

Reaction efficiency (%) =

$$\frac{\text{Amount (g) of Si in } Si_3N_4 \text{ powder obtained}}{\text{Amount (g) of Si in } SiH_4 \text{ gas supplied}}$$

Table 1 shows that the powder obtained according to the present invention has a smaller particle size and does not contain any unreacted substances and that the reaction efficiency is high.

EXAMPLE 2

Fine powder of metal silicon was produced under the same conditions as in Example 1. Argon (Ar) gas containing 5 vol % of $SiCl_4$ was introduced into the reaction chamber at a rate of 5 l/min. A powder of metal silicon having a particle size of 100–300 Å was obtained.

When the reaction gas was merely heated by laser beam in a not-discharged state, the reaction product contains unreacted $SiCl_4$ and the particle size was as large as 500 Å.

EXAMPLE 3

Various combinations were tried as shown in Table 2

What is claimed is:

1. A process for manufacturing a fine powder of a metal or ceramics comprising the steps of mixing a gas of volatile metal compound and/or an evaporated metal and a reaction gas in a gaseous state ionizing the mixture and heating the ionized mixture with a laser beam to produce the powder.

2. The process as claimed in claim 1, wherein said volatile metal compound is a halide, hydride or organic compound of a metal.

3. The process as claimed in claim 1, wherein said reaction gas is an inert gas or nitrogen, an organic or inorganic gas containing nitrogen, or an organic or inorganic gas containing carbon.

4. The process as claimed in claim 1, wherein said mixture is kept in an ionized state by at least one of a group consisting of direct current discharge, high-frequency discharge and microwave discharge.

5. An apparatus for manufacturing a fine powder of a metal or ceramics, said apparatus comprising a reaction chamber into which a mixture of a gas of volatile metal compound and/or an evaporated metal and a reaction gas is introduced for reaction, means for putting said reaction chamber in a discharged state by at least one selected from the group consisting of direct current discharge, high-frequency discharge and microwave discharge, and means for irradiating laser beams through said reaction chamber in a discharged state to heat said mixture.

* * * * *